April 10, 1951   J. H. OSWALD   2,548,681
FASTENING

Filed Feb. 13, 1946   3 Sheets-Sheet 1

INVENTOR.
Joseph H. Oswald
BY Ray S. Gehr
ATTORNEY

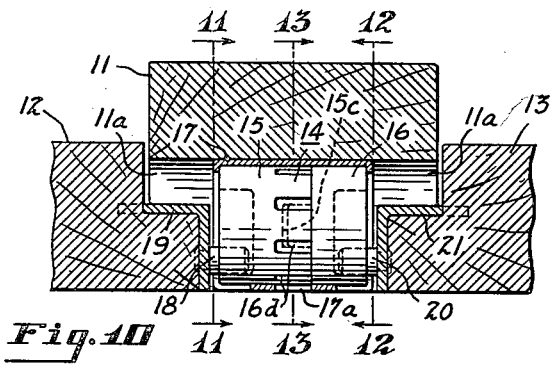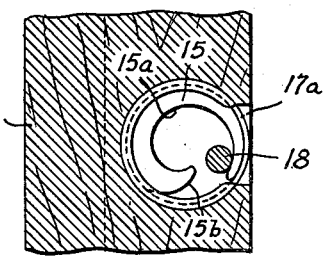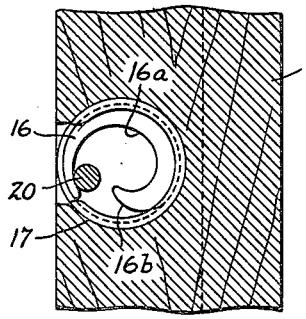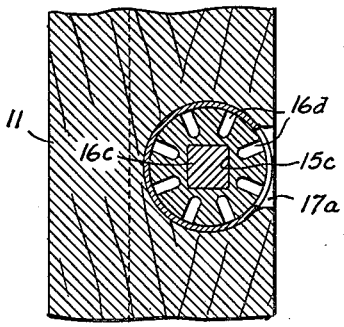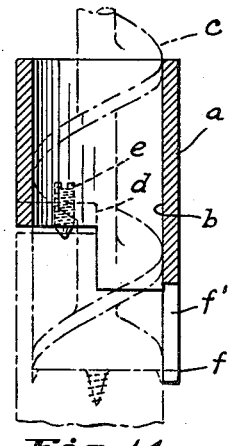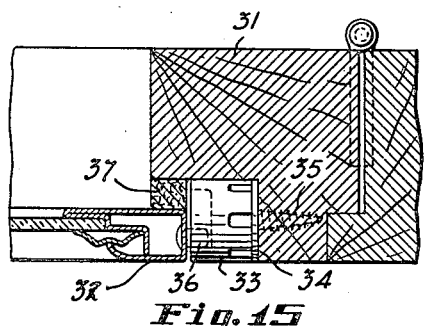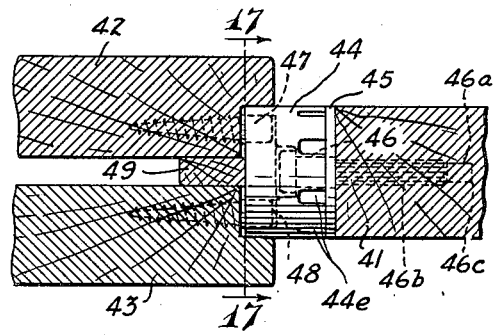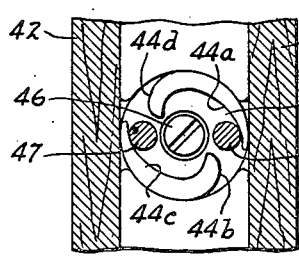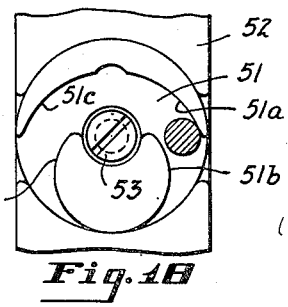

April 10, 1951     J. H. OSWALD     2,548,681
FASTENING
Filed Feb. 13, 1946     3 Sheets-Sheet 3
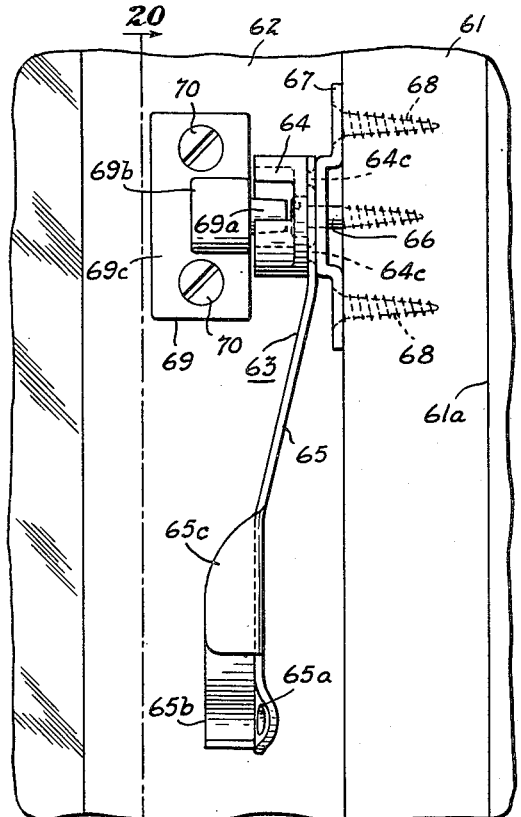
Fig. 19
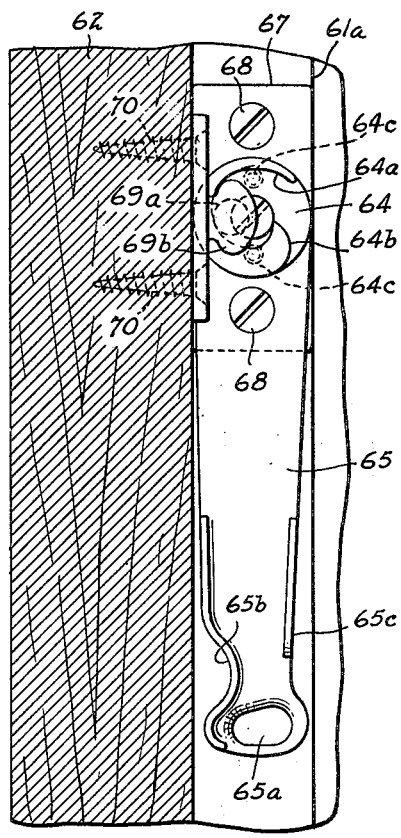
Fig. 20
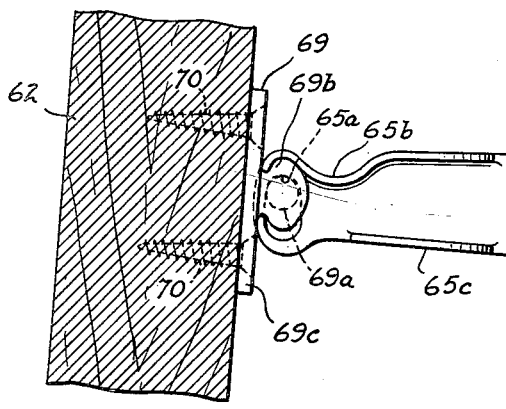
Fig. 21
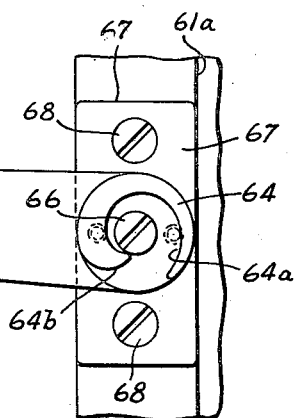
INVENTOR.
Joseph H. Oswald
BY Ray S. Gehr
ATTORNEY Patented Apr. 10, 1951

2,548,681

UNITED STATES PATENT OFFICE 2,548,681

FASTENING

Joseph H. Oswald, South Euclid, Ohio

Application February 13, 1946, Serial No. 647,240

3 Claims. (Cl. 292—240)

The invention relates to devices for disengageably fastening together cooperating structural parts such, for example, as a panel and a supporting structure therefor, or the body of a box and its cover.

It is an object of the invention to provide a generally improved disengageable fastening of a double acting type in which the parts secured together are moved positively into firm mutual engagement and are positively separated when the fastening is disengaged.

More specifically, it is an object of the invention to provide such a double acting fastening device that can be manufactured and installed at low cost and that is highly compact, pleasing in appearance, and easy to operate.

Other objects of the invention more or less ancillary or incidental to those above stated will be apparent from the description which follows.

With the various stated objects in view the invention consists in certain forms, arrangements and combinations of parts hereinafter pointed out and explained in connection with typical embodiments of the invention shown in the accompanying drawings.

Figure 2:
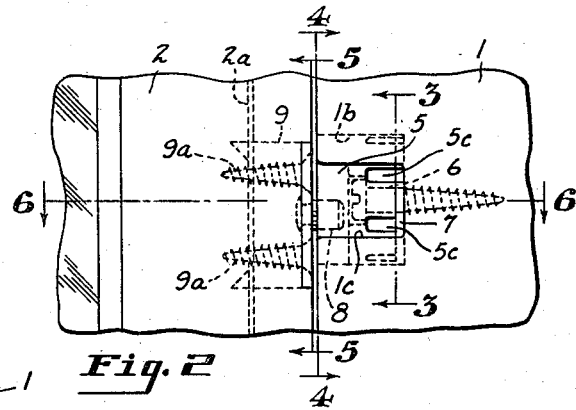
Fig. 2 is a fragmentary front elevation of one of the right hand fastening devices shown in Fig. 1, with the parts enlarged to about full size for such door application.
Figure 3:
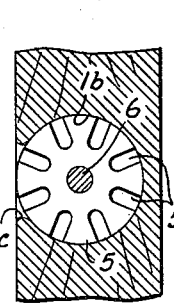
Figure 4:
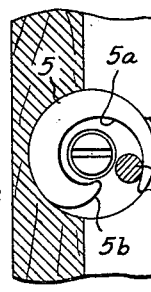
Figure 5:
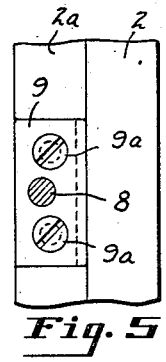

Figs. 3, 4 and 5 are sections on the lines 3—3, 4—4 and 5—5, respectively, of Fig. 2.

Figure 6:
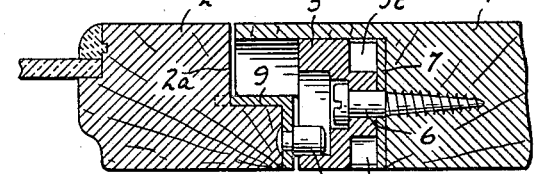

Fig. 6 is a horizontal section on the line 6—6 of Fig. 2.

Figure 7:
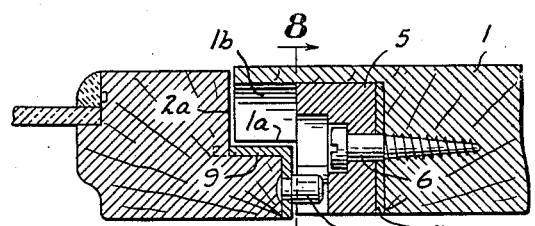

Fig. 7 is a view similar to Fig. 6 but with the fastening cylinder turned to a position to effect disengagement of the parts.

Figures 8, 9:
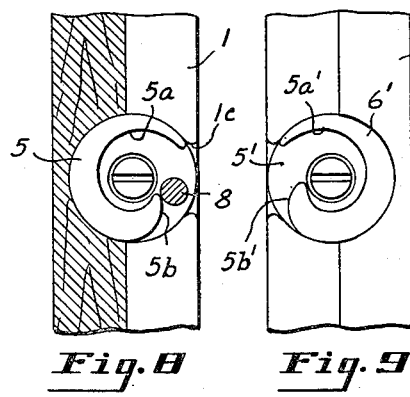

Fig. 8 is a vertical section on the line 8—8 of Fig. 7.

Figure 1:
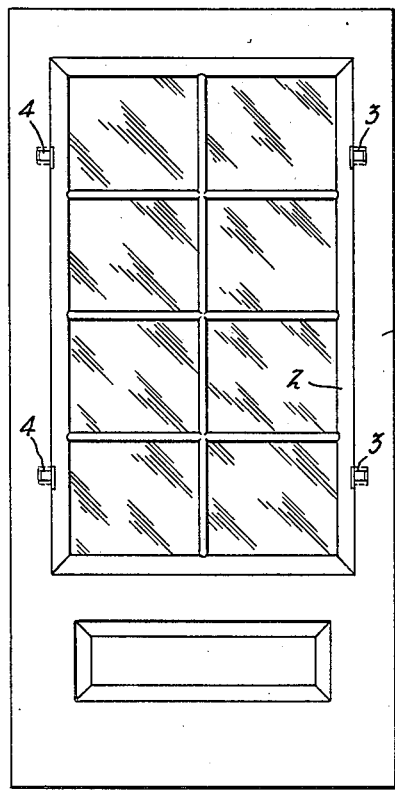
Fig. 1 is a front elevation of a combination storm and screen door presenting one form and application of the fastening device.

Fig. 9 is a view corresponding to Fig. 8 but showing parts of one of the left hand fastenings of Fig. 1.

Fig. 10 is a horizontal section corresponding to Fig. 6 but showing a modified form of the fastening suitable for a double panel structure.

Figs. 11, 12 and 13 are sections taken on lines 11—11, 12—12 and 13—13, respectively, of Fig. 10.

Fig. 14 is a side elevation of a drill jig and gauge for boring a suitable hole for the installation of the fastening device.

Fig. 15 is a horizontal sectional view showing an application of the fastening device to the mounting of a metal framed glass panel in a wooden window or door frame.

Fig. 16 is a horizontal section showing a modified multiple form of fastening adapted to disengageably connect three wall or partition elements together.

Fig. 17 is a section on the line 17—17 of Fig. 16.

Fig. 18 is a sectional view corresponding to Fig. 17 but showing a modified form of the fastening.

Fig. 19 is a fragmentary inside elevation showing the present invention embodied in a fastening and ventilating device for storm windows.

Fig. 20 is a vertical section on the line 20—20 of Fig. 19 showing the parts in the positions occupied when the storm window is closed.

Fig. 21 is a sectional elevation also taken on the line 20—20 showing the storm window in open position.

Referring in detail to the constructions illustrated and first to that shown in Figs. 1 to 9, inclusive, 1 designates as an entirety the main frame or body of a storm door having a removable glazed panel 2 designed to be replaced for summer use by a similar panel fitted with screen cloth instead of glass. The door is provided with four of the improved fastening devices, those on the right hand side of the door being designated as entireties by the numeral 3, and those on the left hand side of the door by the numeral 4, the fastenings 3 and 4, preferably, though not necessarily, being slightly different in design, as will later be explained.

Referring to the enlarged views showing one of the fastenings 3, it will be observed that the door frame 1 and the panel 2 have their mating edges rabbeted at 1a and 2a, respectively. Adjacent its rabbeted edge the door frame 1 is bored out at 1b to form a cylindrical recess in which is disposed a centrally apertured cylindrical body 5, of metal or other suitable material, rotatably mounted on the shaft of a screw 6 which secures the cylinder to the frame 1 with an intervening metal washer 7. The end of the cylinder 5 remote from the washer 7 is shaped to form an inclined surface 5a (Fig. 4) facing toward and eccentric to the axis of the cylinder, the inclined surface being roughly spiral in form. The cylinder 5 is further formed with a second inclined surface 5b which is also eccentric to the axis of the cylinder but faces away from the axis. Surface 5b is also roughly spiral in form. Both of the surfaces 5a and 5b incline outward in the same circumferential direction.

The inclined surfaces of the cylinder 5 are designed to function as cams in cooperation with a metal stud 8 which projects from an angle piece 9 secured by screws 9a to the rabbeted edge of the panel 2. From an inspection of Figs. 3 and 5 it will be observed that the cylindrical recess 1b in the frame of the door 1 has one side intersecting the face of the frame. Adjacent this intersection the frame is slightly cut away to form an opening 1c as shown in Fig. 4 so that a substantial arc of the cylinder 5 is exposed to permit its engagement for manual rotation of the cylinder. To facilitate such rotation the cylinder adjacent the end thereof which engages the washer 7 is formed with depressions or cavities 5c into which a nail or other elongated piece of metal can be inserted as a lever to rotate the cylinder.

From an inspection of Figs. 4 and 6 it will be clear that rotation of the cylinder 5 in a clockwise direction, as viewed in Fig. 4, will cause the inclined surface 5a to force the stud 8 inward from the position shown in Fig. 7 toward the screw 6 so as to press the detachable panel firmly against the frame 1 as shown in Fig. 6. Rotation of the cam 5 in the opposite direction will cause the outwardly facing inclined surface 5b to engage the inner side of stud 8 and positively move it in a direction to separate the panel 2 from the door frame 1. Due to too tight a fit or to adherence of painted or varnished surfaces such panels tend to stick, and the positive cam action of the inclined surface 5b is accordingly quite advantageous.

It will be noted that the cam surfaces 5a and 5b are so disposed in relation to each other and to the axis of cylinder 5 that no part of the inwardly facing surface 5a lies, in relation to the cylinder axis, radially outside of the surface 5b. The significance of this is that it is possible, in designing the fastening, to carry the two cam surfaces as close as may be desired to the center or axis of the cylinder so that the stud 8 can be of ample diameter for strength while the diameter of the cylinder can be made relatively small and still permit entrance of the stud between the two cam surfaces.

As shown in Fig. 1 the door is fitted with two of the fastenings 3, such as have been described, to secure the right side of the panel. The left side of the panel can be secured by two fastenings of the same construction as that above described but for the left side of the panel it is preferable to provide cylinder parts 5' having inwardly and outwardly inclined surfaces 5a' and 5b', as shown in Fig. 9. The construction of Fig. 8 may conveniently be termed right hand and that of Fig. 9 left hand. With the left hand form of construction for the fastenings 4 the direction of rotation of the cylinders 5 and 5' to tighten the fastenings is downward in each case; whereas if cylinders of identical form are used for the fastenings 3 and 4 the direction of rotation would be different on the two sides of the frame, with resultant confusion.

From the foregoing description it will be apparent that in the application of the removable panel to the door frame the cylinders 5 and 5' of the fastenings 3 and 4 are set to positions such as shown in Figs. 8 and 9 so that the inclined or cam surfaces of the cylinders will permit the introduction of the projecting studs 8 of the panels. The cylinders of the fastenings are then rotated one after the other to engage their inwardly facing inclined surfaces with the studs so as to force the latter toward the axes of the cylinders and press the panel home against the frame 1 of the door. In carrying out this locking action all of the cylinders of both the fastenings 3 and 4 are rotated downward. When, from season to season, it is desired to change the panel of the door, the panel in use is readily removed by the reverse rotation of the cylinders to free the lugs of the panel and, as has been explained, this movement, by the action of the outwardly facing cam surfaces of the cylinders, positively separates the panel from the door frame. The cam action of the cylinders is very powerful and a panel which has become "frozen" in place is readily removed without the use of any tool other than a nail or equivalent means. Thus the necessity of hammering (and probably marring) the panel to loosen it is avoided and, on the other hand, the powerful inwardly facing cams press the panel into very firm engagement with the door frame and effect a weather-tight joint.

The construction and mounting of the cylinder 5, or 5', can be modified in various ways, as will later be apparent from the various forms of construction shown in the drawings; but the relative arrangement of the cam surfaces which has been described and the form of the cylinder 5 in other respects contribute both to low cost and satisfactory functioning of the device. Low cost arises both from the possible small diameter of the cylinder 5 and the fact that it can be die cast from aluminum alloy or other suitable metal with ample accuracy to avoid machining or other finishing expense. Furthermore, the small diameter of the cylinder makes the fastening suitable for mounting in thin door, window, and other structures, and thus greatly increases its field of application and usefulness.

Figs. 10 to 13, inclusive, illustrate a modified form of the invention suitable for use in securing panel structures to upright supports as in the case of porch enclosures, partition structures and the like. The construction shown comprises a post or upright 11 which has two of its corners recessed or rabbeted to receive the correspondingly rabbeted edges of panels 12 and 13. The post 11 on its rabbeted side is bored out to form a cylindrical recess 11a which intersects the side surface of the post 11 and the wood of the post immediately adjacent the intersection is cut away, just as in the case of the construction previously described.

Within the thus-formed recess 11a of the post is mounted a cylindrical fastening unit designated as an entirety by the numeral 14 and consisting of elements 15 and 16. This cylindrical unit 14 is rotatably mounted in a metallic shell 17 which is mounted in the recess 11a with a pressed fit and thus rigidly secured to the post 11. The end edges of the shell are turned inward to secure the unit 14 against axial displacement. As appears in Fig. 11 one end of the cylinder element 15 is formed precisely like the cam end of the cylinder 5 with inwardly and outwardly facing inclined surfaces 15a and 15b, respectively, identically the same as shown in Fig. 8; while as shown in Fig. 12 one end of the element 16 is formed with inwardly and outwardly facing inclined surfaces 16a and 16b, respectively, identically like those shown in Fig. 9. In other words, the cam surfaces of element 15 are of the right hand type while those of the element 16 are of the left hand type. The inclined cam surfaces of element 15 cooperate with the lug 18 which projects from the angle 19 secured to the panel 12 while the inclined surfaces of the unit 16 similarly cooperate with the lug 20 of the angle 21 secured to the panel 13.

As is shown in Figs. 10 and 13 the inner ends of the cylinder elements 15 and 16 are formed, respectively, with a rectangular recess 15c and a similarly shaped lug or projection 16c which interconnect the two elements and insure rotation as a unit. Also the element 15 is formed at its inner end with depressions or sockets 16d to receive an actuating tool to rotate the cylindrical unit, the shell 17 being apertured at 17a to permit the insertion of the tool.

In the last described construction the shell 17, which is fixedly secured to the post 11, obviously performs the function of the screw 6 of the first described construction, namely, of rotatably supporting the cylinder elements and securing them to the structural element 11. The reason for forming the cylinder unit in two parts as shown and described is to permit easy fabrication of the parts by die casting.

Those familiar with woodworking practice will understand that the formation of cylindrical recesses such as those at 1b in the first described construction and 11a in the second construction, can be facilitated by the use of suitable jigs and tools. For exemplification Fig. 14 shows a jig and gauge a suitable for use in forming the cylindrical recesses in the frame of the door 1. Here the jig is formed with a cylindrical bore b to receive a drill or auger c and is notched to fit the rabbeted edge of the frame. Exteriorly the jig is formed, at either side, with lugs d to receive pointed set screws e designed to enter the frame edge and hold the jig in position. The jig is formed with a depending apron f formed with a vertical slot f' which serves as a sight gauge permitting the workman to stop the drill when it reaches the desired depth. In addition to the holding screws e, use may be made of a clamp to more rigidly secure the jig to the work. It will, of course, be understood that the jig a is but one of many forms which may readily be devised to suit different types of work.

In Fig. 15 is shown an application of the type of fastening first described applied to a window of a composite type. Here a sash frame 31 of wood is shown hinged to a supporting window frame and the said frame 31 is fitted with detachable glazing panel comprising a metal frame 32 of known construction. To secure the glazing, frame 31 is fitted with a fastener cylinder 33, washer 34 and securing screw 35 of the character used in the first described construction; and the inclined cam surfaces of cylinder 33 cooperate with a stud 36 which is rigidly secured, as by riveting, to the metal frame 32 of the glazing panel. The sash frame 31 is supplied with a heavy felt packing strip cemented in place to be engaged by the metal glazing frame 32 so that an exceedingly tight joint is formed between the glazing and the sash frame when the former is clamped in position by the rotation of the cylinder 33.

Another application of the improved fastening is shown in Figs. 16 and 17 where a fixed partition or wall member 41 has secured to it a double partition composed of panels 42 and 43. Here a cylindrical aperture is bored edgewise in the wall member 41 with the sides of the aperture intersecting or tangent to the two faces of said member 41. A metal cylinder 44 and washer 45 are then attached by means of a ribbed pin 46 to member 41 so that the cylinder is rotatably secured in position. The pin 46 has its entering end formed to provide a short pilot section 46a of smaller diameter than the maximum diameter of the ribbed portion and the end corner 46c of the pin is broken or dulled to obviate drifting of the pilot section when the pin is driven into a hole of the same or slightly smaller diameter. As shown in Fig. 17 the cylinder 44 is provided with two sets of inclined cam surfaces, the inwardly and outwardly facing surfaces of one set being designated by the numerals 41a and 41b and the other set being correspondingly designated by the numerals 41c and 41d. The cylinder 44, as in the first described construction, is provided with actuating recesses 44e. To cooperate with the cam surfaces of the cylinder the panels 42 and 43 are fitted, respectively, with screw studs 47 and 48. A spacing strip 49 is interposed between panels 42 and 43 to provide an air space between them. From an inspection of Fig. 17 it will be apparent that rotation of the cylinder 44 in one direction will serve to tighten the fastening so as to clamp the panels 42 and 43 together and to the wall member 41, while rotation of the cylinder in the opposite direction will loosen the fastening and positively force the panels apart.

As illustrative of the fact that the cam surfaces of the locking cylinders which have been described can be formed in a variety of ways one such modification is shown in Fig. 18 where the fastening cylinder 51 is of a double type suitable for either right hand or left hand applications and is operatively attached to a structure 52 by rotational mounting on screw 53. In this construction there is a pair of inwardly facing and outwardly facing surfaces 51a and 51b, respectively, and a second pair of such surfaces 51c and 51d, respectively; and the inwardly facing surfaces 51a and 51c are oppositely inclined and disposed on one side of an axial plane of the cylinder while the outwardly facing surfaces 51b and 51d are also oppositely inclined and disposed on the other side of the said plane.

In Figs. 19, 20 and 21 the present invention is shown embodied in a combined lock and ventilating device for storm windows. Here are shown a side portion of a window frame 61 with stop surface 61a and an adjacent portion of a storm sash 62, the storm window being of the type pivotally supported at the top so that it can swing out away from the frame at the bottom and the portions of the frame 61 and sash 62 shown being lower parts of the window structure. In this device the movable part of the fastening is designated as an entirety by the numeral 63 and comprises a metal cylinder 64 and a flexible metal arm 65 which is rigidly secured to the cylinder 64 by riveted lugs 64c, 64c of the cylinder which engage apertures in the arm. The two parts 64 and 65 thus rigidly united rotate as a unit on the securing screw 66 which is secured to the wood frame 61 with an interposed metal bracket 67 which is secured to the frame 61 by screws 68 and serves as an abutment for the fastener unit 63. On its exposed end the cylinder 64 is formed with inwardly and outwardly facing eccentric cam surfaces 64a and 64b, respectively. The arm element 65 of the fastening unit is relatively thin and resiliently flexible. At its free end the arm is formed with a transversely elongated aperture 65a and near the same end has laterally turned longitudinal flanges 65b and 65c by which the arm can be conveniently grasped.

For cooperation with the cylinder unit of the fastening the window sash 62 is provided with a fitting designated as an entirety by the numeral 69 which consists of a metal bracket having a stud 69a projecting laterally from a lug 69b carried by a bass 69c which is apertured to receive securing screws 70, 70. From an inspection of Figs. 19 and 20, which show the storm window in closed position, it will be seen that when the arm 65 of the cylinder unit is turned upward 180° from the position shown in Fig. 20 the opening between the inclined cam surfaces 64a and 64b is disposed to receive the lug 69a between them so that the storm sash can swing into a nearly closed position. Then by rotating the cylinder unit in a clockwise direction (as viewed in Fig. 20) the cam surface 64a is caused to engage lug 69a and force the sash into a tightly closed position against the stop of the window frame, thus effecting an excellent weather-tight closure. When it is desired to open the sash from the closed position shown in Fig. 20 the cylinder arm 65 can be grasped to move the cylinder in a counter-clockwise direction and this movement brings the outwardly facing cam surface 64b in contact with the stud 69a and forces the latter and the sash outward, this action exerting a strong force upon the window sash to effectively overcome any tendency which it may have to stick in the closed position. When it is desired to hold the storm sash in an open position to secure ventilation through the window opening it is only necessary to swing the cylinder arm 65 outward to the position shown in Fig. 21 so as to connect the free end of the arm with the fitting 69. This is readily accomplished by flexing the arm laterally so that the aperture 65a of the arm can snap over the stud 69a, the arm 65 being bevelled adjacent aperture 65a to facilitate this action. Flange 65b of the arm is preferably formed as shown so as to embrace the upper side of the lug 69b for firm engagement.

The structure last described affords a rugged and powerfully acting, easily manipulated fastening device which is simple and inexpensive in construction, easily mounted for use and adapted to provide long service without upkeep expense.

It will be seen that in each of the forms of construction which have been described the fastening device comprises three parts, two of which are fixedly secured, respectively, to the two structures which are to be fastened together, while a third part is movably mounted on one of the fixed parts and one of the three parts is provided with inclined or cam surfaces to effect relative movement of the fixed elements and the structures to which they are attached.

In each of the described forms of construction the peculiar form and arrangement of the cam means and the arrangement of the inwardly facing and outwardly facing cam surfaces in relation to each other contribute to freedom of relative lateral movement of the cam and cam follower parts across the axis of the cam body and make possible the use of rugged cam and follower parts in a device of small size.

The advantages of the fastening in its various forms including simplicity, low cost, pleasing appearance and effectiveness to secure both a tight closing and effective separation or opening of the fastening even when the structures secured are strongly adherent to each other, are sufficiently indicated by the foregoing description without need for further comment. However, it may well be pointed out that the powerful action of the fastening device to effect separation of connected structures is particularly important when the fastening is applied to structures in which the elements thereof are exposed on only one side when the fastening is applied or locked. Thus where the fastening is used to secure the cover of a box the positive disengaging action of the fastening is particularly advantageous.

It will further be apparent that the improved fastening may take a wide variety of forms in addition to those illustrated and described and that it is thus adapted to a correspondingly wide variety of applications. Accordingly the scope of the invention is not limited to the structures which have been illustrated and described but extends to all equivalent devices indicated by the appended claims.

What is claimed is:

1. In a fastening for disengageably fastening together cooperative structures, the combination of two separate parts constructed to be fixedly attached, one to one of such cooperating structures and the other to the other of such structures, and a third part supported for manual rotation about a fixed axis on one of the said separate parts, the third part having a surface substantially at right angles to its axis of rotation and integrally formed cam means projecting from said surface, the cam means being disposed at a substantial radial distance from the said axis of rotation and having a pair of substantially spiral cam surfaces which incline outwardly away from the rotational axis of the third part in the same general direction around the said axis with one of them facing inwardly toward the said axis and the other facing outwardly away from the axis and with no part of the inwardly-facing surface disposed radially outside of the outwardly-facing surface.

2. A fastening as claimed in claim 1 in which the third part is cylindrical and the part by which the third part is rotatably supported comprises a tubular metal shell surrounding and slidably engaging the third part.

3. A fastening as claimed in claim 2 in which the shell has an opening in its side wall and the third part has a circular series of depressions in its side wall accessible through the said opening of the shell.

JOSEPH H. OSWALD.

REFERENCES CITED

The following references are of record in the file of this patent:

UNITED STATES PATENTS

| Number | Name | Date |
| --- | --- | --- |
| 451,702 | Sims | May 5, 1891 |
| 837,811 | Ebbeson | Dec. 4, 1906 |
| 855,259 | Richards | May 28, 1907 |
| 1,420,899 | Williams | June 27, 1922 |
| 1,476,501 | Ferry | Dec. 4, 1923 |
| 1,941,031 | Johanson | Dec. 26, 1933 |
| 2,136,408 | Bedell | Nov. 15, 1938 |
| 2,236,804 | Miller | Apr. 1, 1941 |

FOREIGN PATENTS

| Number | Country | Date |
| --- | --- | --- |
| 21,380 | Great Britain | Nov. 6, 1894 |